United States Patent
Knop

(10) Patent No.: US 11,222,001 B2
(45) Date of Patent: Jan. 11, 2022

(54) AUGMENTING MIDDLEWARE COMMUNICATION SERVICES

(71) Applicant: SAP SE, Walldorf (DE)

(72) Inventor: Roger Knop, Bous (DE)

(73) Assignee: SAP SE, Walldorf (DE)

(*) Notice: Subject to any disclaimer, the term of this patent is extended or adjusted under 35 U.S.C. 154(b) by 863 days.

(21) Appl. No.: 13/834,098

(22) Filed: Mar. 15, 2013

(65) Prior Publication Data

US 2014/0279932 A1    Sep. 18, 2014

(51) Int. Cl.
*G06F 16/23* (2019.01)
*H04L 29/08* (2006.01)

(52) U.S. Cl.
CPC .......... *G06F 16/23* (2019.01); *H04L 67/2861* (2013.01); *H04L 67/2895* (2013.01); *H04L 67/34* (2013.01)

(58) Field of Classification Search
CPC . G06F 16/23; H04L 67/2861; H04L 67/2895; H04L 67/34
See application file for complete search history.

(56) References Cited

U.S. PATENT DOCUMENTS

| | | | |
|---|---|---|---|
| 5,995,972 A * | 11/1999 | Allgeier | G06F 17/30067 |
| 6,434,568 B1 * | 8/2002 | Bowman-Amuah | G06F 17/30607 |
| 7,225,249 B1 * | 5/2007 | Barry | G06F 17/3089 709/227 |
| 2002/0196741 A1 * | 12/2002 | Jaramillo | H04L 51/18 370/252 |
| 2004/0153511 A1 * | 8/2004 | Maynard | G06F 9/546 709/206 |
| 2006/0059107 A1 * | 3/2006 | Elmore | G06Q 20/382 705/64 |
| 2006/0294112 A1 * | 12/2006 | Mandato | H04L 29/06027 |
| 2007/0047279 A1 * | 3/2007 | Evans | G06F 9/541 365/1 |
| 2008/0215743 A1 * | 9/2008 | Wahl | 709/230 |
| 2010/0017508 A1 * | 1/2010 | Donadio | H04L 41/0253 709/224 |
| 2011/0041006 A1 * | 2/2011 | Fowler | 714/10 |
| 2012/0124202 A1 * | 5/2012 | Cooper et al. | 709/224 |

(Continued)

*Primary Examiner* — Alford W Kindred
*Assistant Examiner* — Lin Lin M Htay
(74) *Attorney, Agent, or Firm* — Schwegman Lundberg & Woessner, P.A.

(57) ABSTRACT

Various embodiments herein include one or more of systems, methods, and software providing augmenting middleware communication services. Embodiments generally include services executable to provide communication capabilities between a middleware platform and an application, such as an enterprise-class application, to facilitate access to data and functionality of the application by mobile applications that access application functionality and data via the middleware platform. Some embodiments include augmenting the application with at least one service to receive a call from a middleware object requesting data and to identify data to be included in a response to the request. The identified data may then be retrieved and returned to the calling middleware object. The call of the middleware object is typically received from a mobile device application and the middleware object provides data received in response to the request to the mobile application.

18 Claims, 4 Drawing Sheets

(56) References Cited

U.S. PATENT DOCUMENTS

2013/0091252 A1\* 4/2013 Pizzorni et al. ............. 709/219
2013/0227547 A1\* 8/2013 Little ....................... G06F 8/60
 717/177

\* cited by examiner

AUGMENTING MIDDLEWARE COMMUNICATION SERVICES

BACKGROUND INFORMATION

Providing mobile applications access to data and services of an enterprise application, such as an Enterprise Resource Planning (ERP) or a Customer Relationship Management (CRM) application, is important in today's mobile computing environment. To provide mobile applications such access, organizations often utilize middleware platforms. Such middleware platforms are very good at interactions with mobile applications, such as may execute on smartphone and tablet devices. However, integration of enterprise application functionality and data is more difficult. Entities such as objects within the middleware platform and the mobile applications are often fragile and can be easily broken when changes are made to functionality and data of the enterprise application. Further complicating such integration is that development and maintenance teams that work with enterprise applications are typically are distinct from development and maintenance teams of middleware platforms and mobile applications. As a result, situations often arise where changes are made to the enterprise application that negatively affects middleware platform services and mobile application operation.

DETAILED DESCRIPTION

Figure 1:
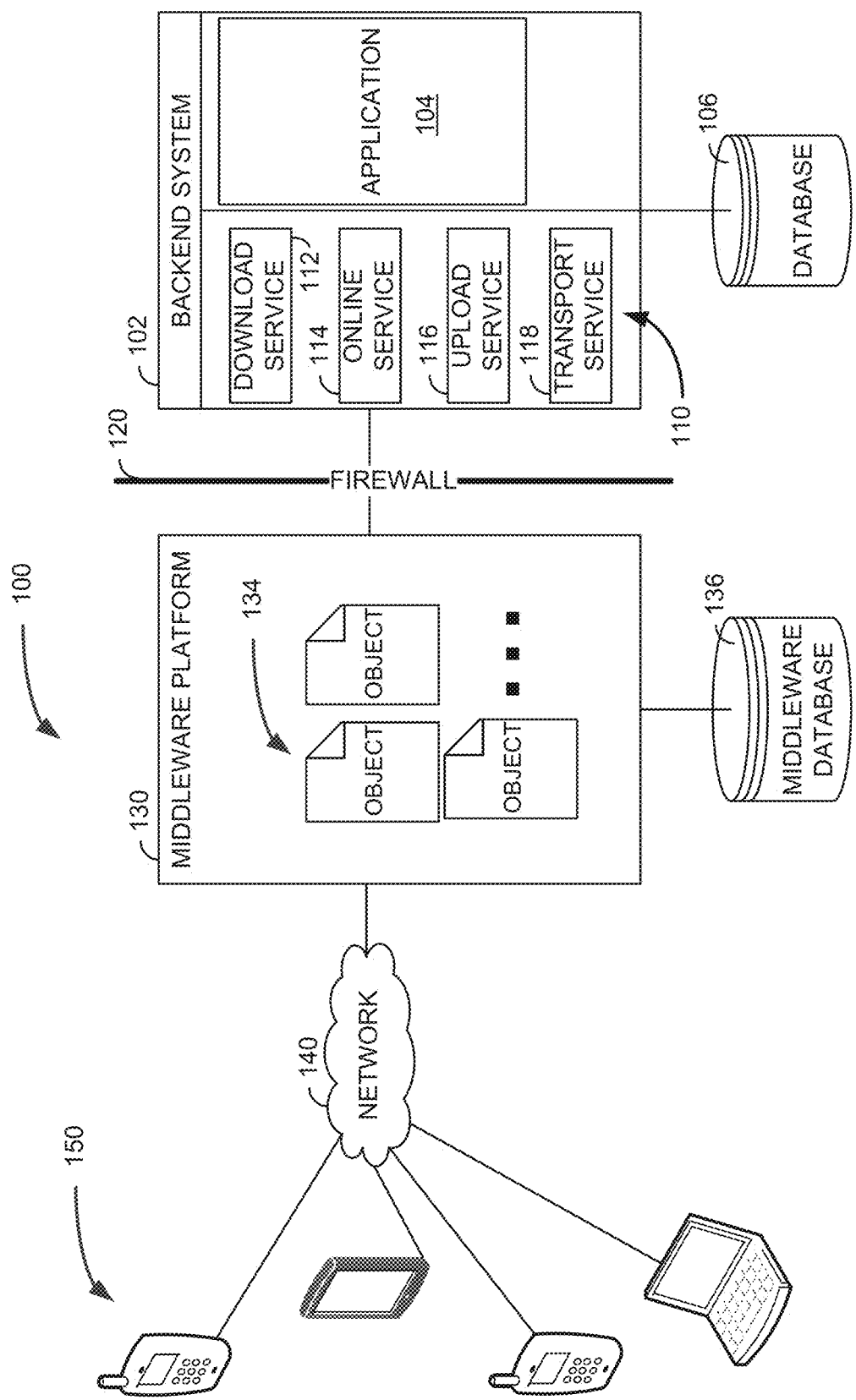
FIG. 1 is a logical block diagram of a system, according to an example embodiment.

Various embodiments herein include one or more of systems, methods, and software providing augmenting middleware communication services. Such embodiments generally include one or more services executable to provide generic communication capabilities between objects of a middleware platform and an enterprise application to facilitate access to data and functionality of the enterprise application by mobile applications. Such mobile applications may execute on various computing device types, such as smartphones and tablet devices.

In some embodiments, an enterprise application stores data identifying one or both of data items and application services of an enterprise application that mobile applications and middleware platform objects are enabled to utilize. This stored data may be stored in a dedicated table including a row of data with regard to data items for middleware objects present on a middleware platform. In other embodiments, the stored data may be stored in metadata of database tables with regard to data columns in the tables. In yet further embodiments, the stored data identifying data items and application services of an enterprise application that mobile applications and middleware platform objects are enabled to utilize may be stored in one or more files.

Regardless of where the data identifying data items and application services of an enterprise application that mobile applications and middleware platform objects are enabled to utilize, this data is consumed, in some embodiments, by generic services dedicated to receiving, servicing, and responding to function, service, data, and other calls between the enterprise application and middleware platform. These services, prior to sending data to the middleware platform, refer to the data identifying data items and application services of an enterprise application that mobile applications and middleware platform objects are enabled to utilize. Generally, when a data item is not identified as being enabled, the data item is not sent to the middleware platform. As a result, changes can typically be made in the enterprise application without affecting performance of the middleware platform or mobile applications.

Various embodiments of augmenting middleware communication services, there deployment and operation, and variations thereto are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a system 100, according to an example embodiment. The system 100 includes a backend system 102, a middleware platform 130, and a variety of mobile devices 150. The backend system 102 and the middleware platform 130 are connected via a network. In some embodiments, such as the illustrated embodiment of the system 100, the middleware platform 130 is deployed on an opposite side of a firewall 120 than the backend system 102. However, in other embodiments, the middleware platform 130 may instead be inside the firewall 120 or inside another firewall deployed between the middleware platform 130 and an external network 140, such as the Internet. The variety of mobile devices 150 connect to the middleware platform via the external network 140.

The backend system 102 and the middleware platform 130 are typically deployed on distinct hardware, such as different server-class computing devices. However, in some embodiments, the backend system 102 and the middleware platform 130 may be deployed on the same server-class computing device. In some such embodiments, the backend system 102 and middleware platform 130 may be deployed within the same or different virtual machine environments on the same server-class computing device or a set of server-class computing devices. An example of such server-class computing devices, and the hardware components included therein, is illustrated and described with regard to FIG. 4.

The backend system 102 includes an application 104, such as an enterprise-class application that maybe various types of enterprise-class applications. Such various types of enterprise-class applications may include an ERP application, a CRM application, a document management application, and the like. Although only a single application 104 is illustrated, multiple applications 104 may be included in other embodiments.

The backend system 102 also typically includes a database 106 that stores application 104 data. Data stored in the database 106 may include data such as transaction data, master data, configuration data, documents, document templates, various forms of content, user interface definitions, stored procedures and data views that provide data processing functionality and data access, and the like.

The backend system 102 may further include augmenting middleware communication services 110. The augmenting middleware communication services 110, in some embodiments, are provided in the backend system 102 as one or more hardware or software modules. In other embodiments, the augmenting middleware communication services 110 are configurable software modules or services within the application 104. In yet other embodiments, the augmenting middleware communication services 110 are add-on modules or software content that can be added on to the application 104.

Regardless of how the augmenting middleware communication services 110 are included and positioned in the backend system 102, the augmenting middleware communication services 110 include services providing generic communication capabilities between objects 134 of a middleware platform 130 and the application 104 to facilitate access to application 104 data and functionality by mobile device 150 applications and apps. The augmenting middleware communication services 110 remove any requirements for objects, services, methods, and other portions of the application 104 to include specific middleware platform 130 communication and integration coding. Instead, the objects, services, methods, and other portions of the application 104 can leverage the augmenting middleware communication services 110 to communicate with the middleware platform 130 and objects 134 included therein. While there may still be some instances where objects, services, methods, and other portions of the application 104 may include specific middleware platform 130 communication and integration coding, these instances are at least significantly minimized. The augmenting middleware communication services 110 will be described further below following description of the middleware platform 130 and other portions of the system 100.

Communication between the augmenting middleware communication services 110 and the middleware platform 134, and objects 134 therein, may be conducted according to one or more communication standards, whether the standards are general publicly defined standards or proprietary standards. For example, Hyper-Text Transfer Protocol may be utilized in some embodiments to exchange messages and data encoded according to the JavaScript Object Notation (JSON) standard. However, other data transport and data encoded standards may be utilized in other embodiments. Further, data, or portions thereof, communicated between the augmenting middleware communication services 110 and the middleware platform 134, and objects 134 therein may be encrypted in some embodiments.

The middleware platform 130 is generally a computing environment established with software that provides services to software applications to communicate. The middleware platform 130 services provide integration capabilities between application 104 in the backend system 102 and applications and apps deployed to the mobile devices 150. In some embodiments, the middleware platform 130 includes a single set of data and functionality services to communicate with the backend system 102 and a plurality of data and functionality services to communicate with different applications and apps that may be deployed to different mobile devices 150. The middleware platform 130 may therefore be considered a data and functionality bridge between mobile device 150 applications and apps and the backend system 102. An example of such a middleware platform is the Sybase Unwired Platform, or SUP, available from SAP AG of Walldorf, Germany.

The middleware platform 130 typically includes a set of objects 134. The objects 134 may exist for various purposes. However, some of the objects 134 are defined to encapsulate logical units of data and functionality for tasks that mobile device 150 applications and apps perform with regard to data and functionality available from the application 104 in the backend system 102. For example, one such mobile device 150 application or app task may include functionality for generation of a product order. An example mobile device 150 app may first provide a view of offered products. One of the objects may exist in the middleware platform 130 to obtain a data listing of all products offered by an organization for which the system 100 exists. Data of the offered products is stored in the database 106 and is accessible via the application 104. A data listing of the offered products may be accessible within the application 104 via a service call. However, that service call is not directly accessible by the mobile device 150 app. Thus, the middleware object in the middleware platform 130 is configured to obtain the offered product listing through communication with the backend system 102 to submit a call of the service and to receive a reply thereto. The middleware object will then perform any translation of the offered product listing data needed for providing the data to the calling mobile device 150 app and transmit the data to the mobile device 150 app. The mobile device 150 app, through communication with the object in the middleware platform 130 is able to obtain the offered product listing data for presentation within the app.

Further, another middleware platform 130 object 134 may exist for receiving an order of a product selected on the mobile device 150 for purchase. This middleware platform 130 object may be configured to receive different data elements from the mobile device app, such as a product identifier, a quantity of product ordered, a customer identifier, a shipping mode option, a delivery address, a price, and other such order data. The data elements received by the middleware platform 130 object may need to be stored in different tables of the database 106 and the storing of the data elements to the database 106 may need to be performed in a certain order or through one or more particular functional elements of the application 104. The middleware platform 130 object, in such an embodiment, may be configured to communicate the order data, in a single logical unit of work to enable rollback functionality, to a plurality of different services of the application 104 and database 106, such as through a plurality of remote function calls. However, the data may be received from the mobile device 150 app in a single communication and the middleware platform 130 object is one logical unit, which may then break up the data into multiple service calls to the application 104 or database 106 in the backend system 102. The middleware platform 130 object may then receive success confirmations in response to each call and send a single confirmation back to the calling mobile device 150 app from which the order data was received. In the event of an error or other failure with regard to any of the calls made by the middleware platform 130 object, a rollback may be performed and the error communicated back to the calling mobile device 150 app.

In some embodiments, the middleware platform 130 may include a middleware database 136. The objects 134, in some embodiments, may be stored in the middleware database 136. In some embodiments, the middleware database 136 may cache data for delivery to mobile device 150 applications and apps. Similarly, the middleware database 136, in some embodiments, may cache data received from mobile device 150 applications and apps for delivery to the application 104 in the backend system 102.

The mobile devices 150 are intended to represent various device types. The various device types may include one or more of smartphones, tablet devices, personal computers, set top boxes, computing devices of automobile information systems, and other such devices. Each of the mobile devices 150 is capable of presenting data to users, receiving input, and connecting to the network 140, such as the Internet, to which the middleware platform 130 is also connected. Each of the mobile devices 150 is also capable of executing an application or app to communicate with the middleware platform 130 over the network 140.

Each of the backend system 102, the application 104 in the backend system 104, the middleware platform 130, and the mobile devices 150 and applications and apps that may execute thereon have been described. The augmenting middleware communication services 110 will now be described in detail.

As mentioned previously, the augmenting middleware communication services 110 include services providing generic communication capabilities between objects 134 of a middleware platform 130 and the application 104 to facilitate access to application 104 data and functionality by mobile device 150 applications and apps. In some embodiments, the augmenting middleware communication services 110 include services that can be leveraged by in a standardized manner by application 104 developers to handle communication with the middleware platform 130 and the objects 134 therein.

Further, various embodiments of the augmenting middleware communication services 110 may further include functionality that determines functionality and data for which the middleware platform 130, objects 134 therein, and mobile device 150 applications and apps are enabled to utilize. This functionality allows for application 104 developers and administrators to make changes in the application 104 and database 106, such as by adding additional data elements, without adversely affecting performance and operation of the middleware platform 130, objects 134 therein, and mobile device 150 applications and apps. In such embodiments, before a service of the augmenting middleware communication services 110 communicates data or exposes functionality to the middleware platform 130 or an object 134 therein, configuration data is considered. The configuration data is considered to determine whether particular relevant data items and functionality are active or inactive with regard to the middleware platform 130 or the object 134 to which the data or functionality is to be provided. Typically, middleware platform 130 and objects 134 therein are functionally synchronized with mobile device 150 applications and apps. Therefore, when the middleware platform 130 and objects 134 therein are active or inactive, the mobile device 150 applications and apps are equally active or inactive. Thus, one configuration setting with regard to a data item or functionality element provides sufficient configuration data with regard to all of the middleware platform 130, objects 134, and mobile device 150 applications and apps. However, some embodiments may include one or more additional levels of configuration settings at the granularity of each of the middleware platform 130, objects 134, and mobile device 150 applications and apps when differences there between are present, such as between different application and app versions, mobile device 150 application and app platform version differences, and the like.

Although different embodiments may include different numbers of and purposes for the augmenting middleware communication services 110, some embodiments include three general augmenting middleware communication services 110. In such embodiments, a first of the three general services may include a download service 112 that communicates data to the middleware platform 130 and objects 134 therein. A second of the three general services may include an online service 114 that operates to provide ongoing interaction capabilities between the application 104 and database 106 and the middleware platform 130 and objects 134. A third of the three general services may include an upload service 116 that operates to receive data from the middleware platform 130 and objects 134, such as for creation and updating of new database 106 records, new transactions, and the like. In some embodiments, each of the three general services 112, 114, 116 may include data processing functionalities but leverage communication capabilities of another service, such as transport service 118, to communicate with the middleware platform 130 and the objects 134.

In some embodiments, the download service 112 operates to receive data download requests with regard to middleware platform 130 objects 134. A data download request may include a middleware platform 130 object 134 identifier identifying a source of the data download request. The download service 112 may generate a response to a received data download request by retrieving, from the database 106 or another data storage location, identifiers of data items relevant to the requesting middleware platform 130 object 134.

The relevant data items may be identified based on one or more of the particular requesting middleware platform 130 object 134, an application 104 or database 106 service identified in the request or associated with the requesting middleware platform 130 object 134, a service or data-referencing naming convention between a name of the requesting middleware platform 130 object 134 and services or data of the application 104 or database 106, or otherwise. However, in some embodiments, as generally referred to, naming conventions of middleware platform 130 objects 134 may be synchronized in a defined manner to link to services, such as remote function calls of the application 104 or database 106.

Regardless of how obtained by the download service 112, the retrieved identifiers of the relevant data items in such embodiments indicate which data items associated with the received data download request are active or inactive. The active and inactive indicators are retrieved with regard to one or more of the requesting middleware platform 130, the middleware platform 130 object 134, or a mobile device 150 application or app where the request originated or the results are to be delivered. In some embodiments, the download service 112 may then retrieve only the active data or retrieve all data and then filter out the inactive data. The download service 112 may then generate and transmit a data structure including the active retrieved data items to the middleware platform 130 object 134 of the middleware platform 130 object 134 identifier. In embodiments including the transport service 118, the download service 112 in performance of one or both of the generating and transmitting of the data structure to the middleware platform 130 object 134, may do so with a call to the transport service 118.

In some embodiments, the online service 114 operates to receive and service ongoing interaction between middleware platform 130 objects 134 and services and data of the application 104 and the database 106. For example, the online service 114 may receive functionality invoking requests from middleware platform 130 objects 134. Processing of a functionality invoking request by the online service 114 may include calling an application 104 service and receiving a response thereto. The online service 114 may then transmit at least a portion of the response to the middleware platform 130 object 134 from which the functionality invoking request was received. In some such instances, a session between the online service 114 and the requesting middleware platform 130 object 134 may be persisted when additional communications with regard to the provided response are likely. In some embodiments including the transport service 110, the communication session and data exchanged between the online service 114 and the middleware platform 130 object may be handled by the transport service 110.

In some embodiments, the upload service 116 operates to receive data updates from middleware platform 130 objects 134. The data updates may include updates to create, read, update, or delete data maintained and stored by the application 104, such as may be stored in the database 106. In some embodiments, the upload service 116 operates to receive, from a middleware platform 130 object 134, a data structure including a data update. Based on data in the data structure, the upload service 116 may then determine database 106 locations to which the updated data is to be stored, which may include not only a change to previously stored data, but also or alternatively an insertion of a new database 106 record or deletion of a database 106 record. The upload service may then issue at least one data update command to the database 106 based on the determined storage locations. Upon receipt of a success response to the data update command, the upload service 116 may then transmit a success response to the middleware platform 130 object 134. However, upon receipt of a failure response to the data update command, the upload service 116 will typically issue a rollback command, if such a command is not automatically triggered within the application 104 or the database 106, to rollback the data update. The upload service 116, upon occurrence of such an update failure, will also transmit a failure response to the middleware platform 130 object 134. As update failure is possible, the upload service 116 will typically issue update commands either to the database 106 or to the application 104 within a single logical unit of work so that in the event of such a failure, the rollback can be performed by issuance of a single command to rollback all data updates associated therewith. The upload service 116, in embodiments including the transport service 118, may conduct some or all communication with the middleware platform 130 and the objects 134 therein, via the transport service 118.

Figure 2:
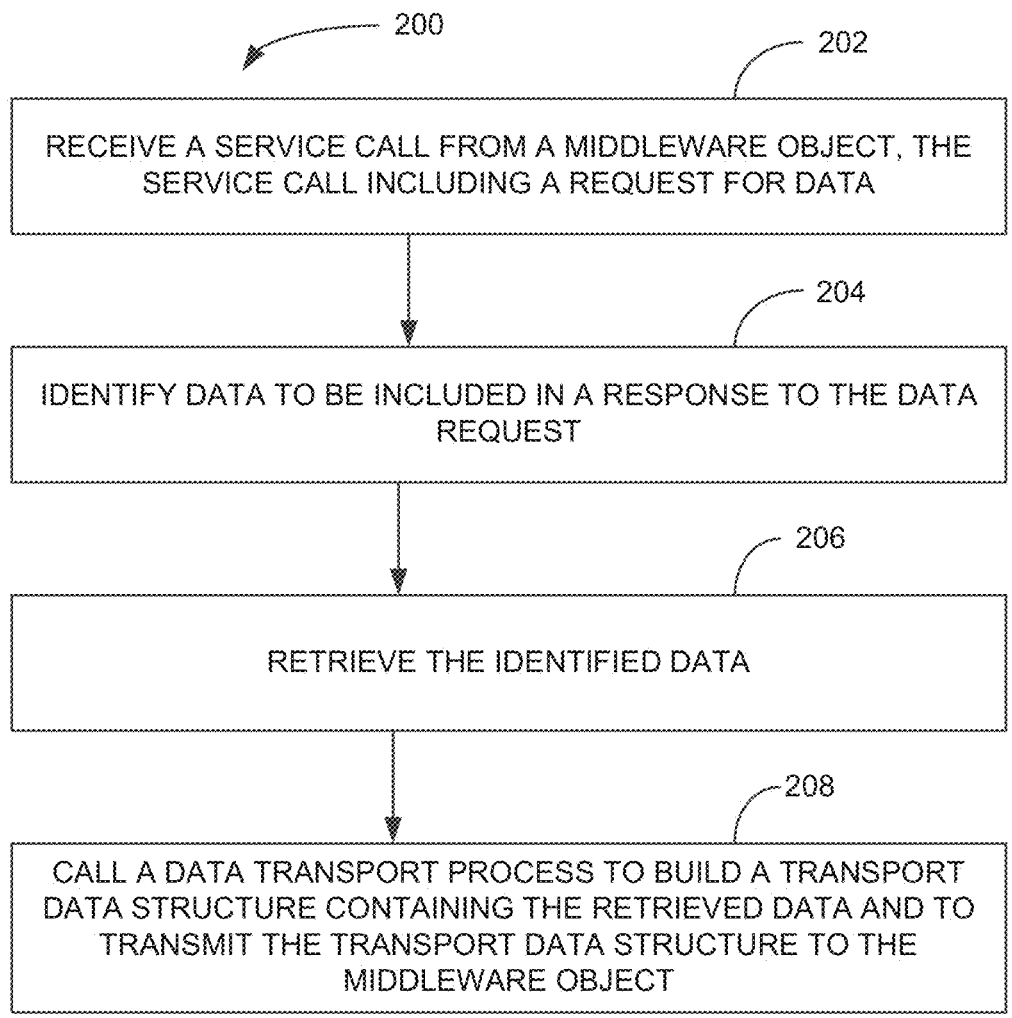
FIG. 2 is a block flow diagram of a method, according to an example embodiment.

FIG. 2 is a block flow diagram of a method 200, according to an example embodiment. The method 200 is an example of how one or more of the augmenting middleware communication services 110 of FIG. 1 may perform in some embodiments. The method 200 includes receiving 202 a service call from a middleware object including a request for data. The received 202 service call, in some embodiments, may be a remote function call of a function or service provided by a backend application, such as the application 104 of the backend system 102 of FIG. 1.

With regard to the data request, the method 200 may then identify 204 data to be included in a response to the data request. For example, identifying 204 data to be included in the response to the data request may includes retrieving data from a database table that identifies active data items the middleware object is capable of processing. Such a database table may store data identifies active data items the middleware object is capable of processing with a row of data for each of a plurality of middleware objects. Each row of data for each of the plurality of middleware objects may identify data items the respective middleware object is capable of processing. In other embodiments, the identifying 204 of data to be included in a response to the data request may include reading metadata associated with a database table, a database view, service, remote function call, or other data storage or programmatic element from which data may be obtained identifying positively or negatively, inclusively or exclusively data items that are either active or inactive. In yet other embodiments, active and inactive data items may be identified in one or more files or other stored data structures.

The method 200 may then retrieve 206 the identified data and transmit the retrieved 206 data to the middleware object from which the request was received. Transmitting the retrieved 206 data to the middleware object may include calling 208 a data transport process to build a transport data structure containing the retrieved 206 data and to transmit the transport data structure to the middleware object. In some such embodiments, the transport data structure built by the transport process is encoded in a format that identifies data items included in the transport data structure and values of each included data item. The format of the data structure, in some embodiments, is a JavaScript Object Notation format.

Figure 3:
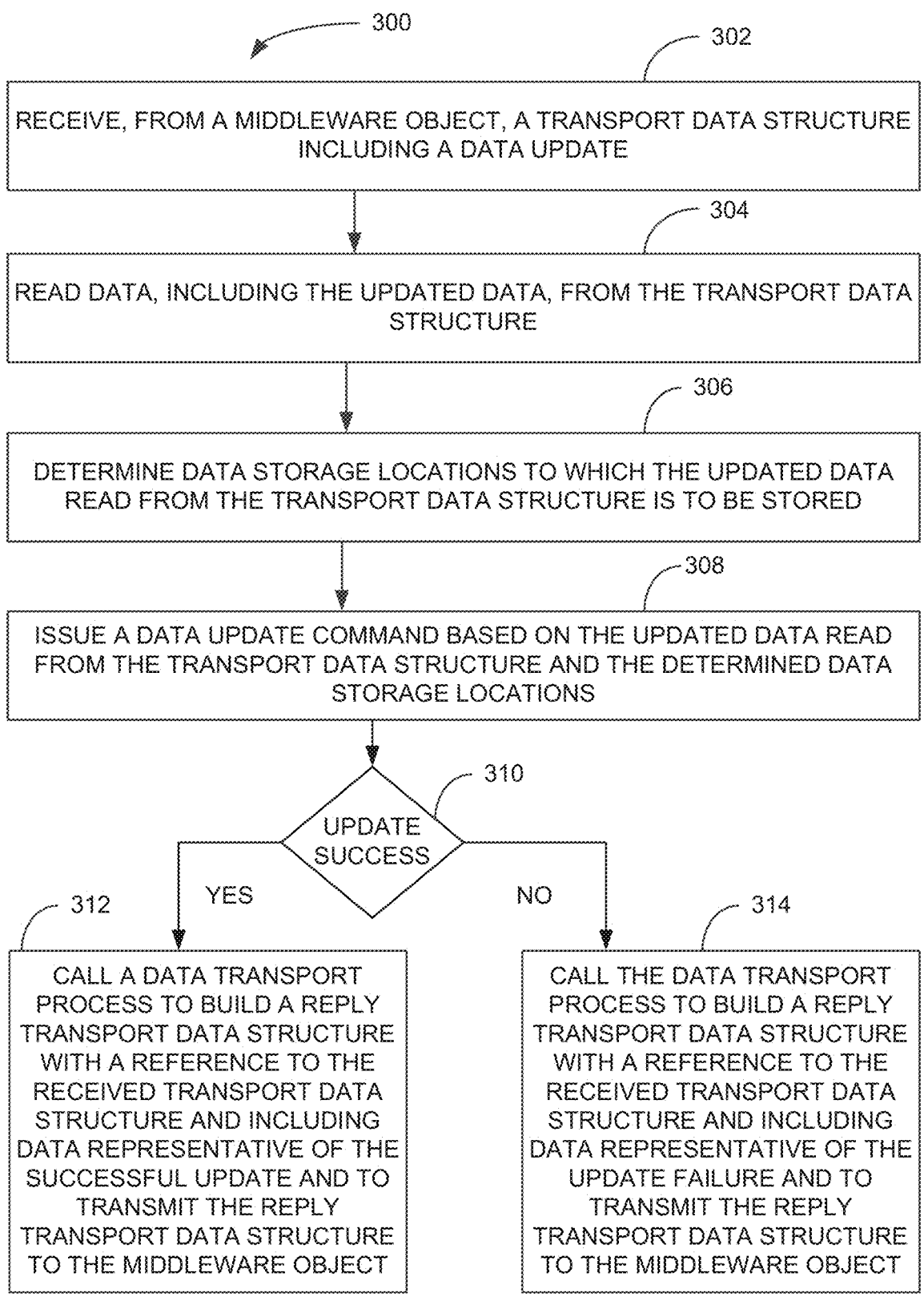
FIG. 3 is a block flow diagram of a method, according to an example embodiment.

FIG. 3 is a block flow diagram of a method 300, according to an example embodiment. The method 300 is another example of how one or more of the augmenting middleware communication services 110 of FIG. 1 may perform in some embodiments. The method 300 includes receiving 302, from a middleware object, a transport data structure including a data update. The method may then read 304 data, including the updated data, from the transport data structure and determine 306 data storage locations to which the updated data is to be stored. The method 300 further includes issuing 308 a data update command based on the updated data read from the transport data structure and the determined data storage locations. The data update command issued 308 may include one or more of an update command, such as in the form of a Structured Query Language (SQL) statement issued to a database, a call of a remote function, stored procedure, service, web service, object service, or other programmatic unit callable within an application or data processing platform. The data update command, when including more than one such command, may be issued 308 within a single transaction or logical unit of work. Issuing 308 the update command within a single transaction or logical unit of work provides an enhanced and simplified ability to rollback the update in the event that one or more the updates are not successful.

The method 300 in such embodiments may then wait to receive a message in response to each issued 308 update command. The method 300, upon receipt of responses to the update commands then determines 310 whether the update was successful. When successful, the method 300 may commit the updates, closing the transaction or logical unit of work and transmit a message indicating update success back to the middleware object from which the transport data structure including the data update was received 302. For example, in some embodiments, the method 300 may include calling 312 the data transport process to build a transport data structure with a reference to the received 302 transport data structure and including data representative of the successful update. The called 312 data transport process may then transmit the transport data structure to the middleware object.

When the determination 310 that the issued 308 update command was not successful, the method 300 may rollback the updates within the transaction or logical unit of work and transmit a message indicating update failure back to the middleware object from which the transport data structure including the data update was received 302. Transmitting the message indicating update failure may include calling 314 the data transport process to build a transport data structure with a reference to the received 302 transport data structure and including data representative of the update failure. The called 314 data transport process may then transmit the transport data structure to the middleware object.

Figure 4:
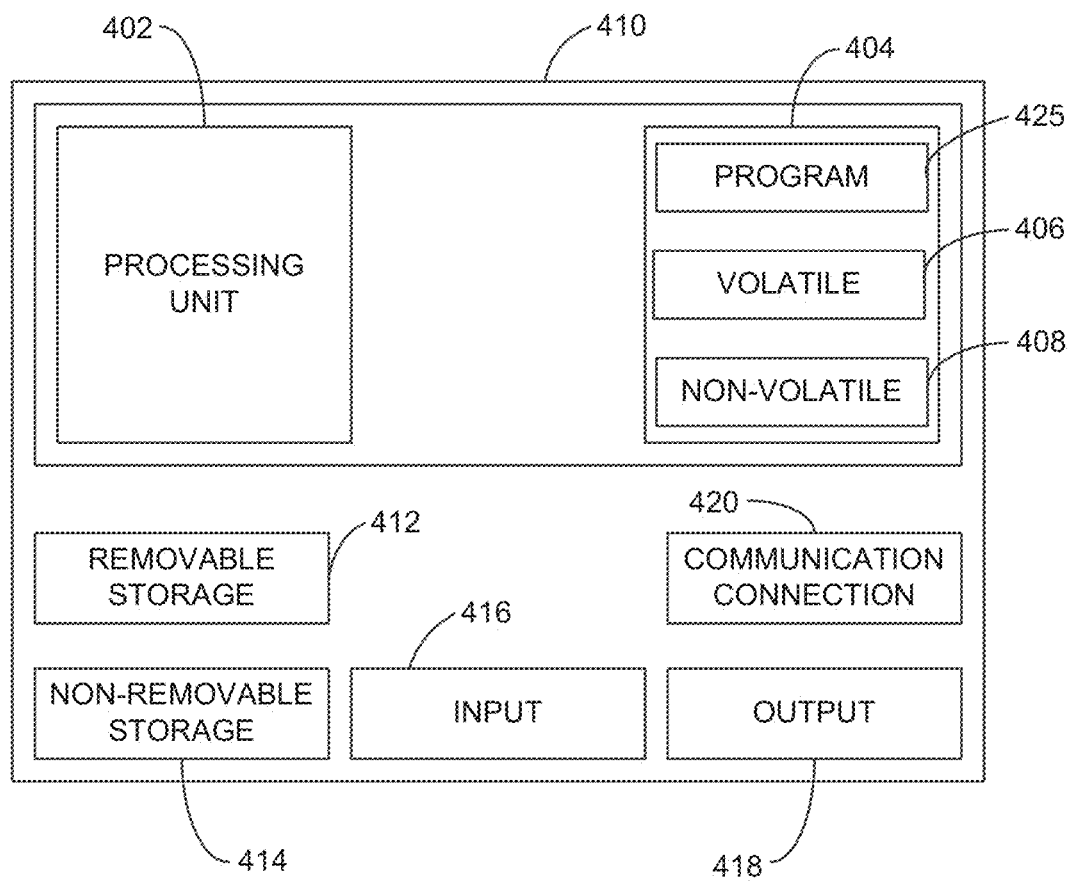
FIG. 4 is a block diagram of a computing device, according to an example embodiment.

FIG. 4 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 410, may include a processing unit 402, memory 404, removable storage 412, and non-removable storage 414. Although the example computing device is illustrated and described as computer 410, the computing device may be in different forms in different embodiments. For example, the computing device may instead be a server-class computer, smartphone, a tablet, or other computing device including the same or similar elements as illustrated and described with regard to FIG. 4. Further, although the various data storage elements are illustrated as part of the computer 410, the storage may also or alternatively include cloud-based storage accessible via a network, such as the Internet.

Returning to the computer 410, memory 404 may include volatile memory 406 and non-volatile memory 408. Computer 410 may include—or have access to a computing environment that includes a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The input 416 may include one or more of a touchscreen, touchpad, mouse, keyboard, camera, and other input devices. The computer may operate in a networked environment using a communication connection 420 to connect to one or more remote computers, such as database servers, web servers, and other computing device. An example remote computer may include a personal computer (PC), server, router, network PC, a peer device or other common network node, or the like. The communication connection 420 may be a network interface device such as one or both of an Ethernet card and a wireless card or circuit that may be connected to a network. The network may include one or more of a Local Area Network (LAN), a Wide Area Network (WAN), the Internet, and other networks.

Computer-readable instructions stored on a computer-readable medium are executable by the processing unit 402 of the computer 410. A hard drive (magnetic disk or solid state), CD-ROM, and RAM are some examples of articles including a non-transitory computer-readable medium. For example, various computer programs or apps, such as one or more applications and modules implementing one or more of the methods illustrated and described herein or an app or application that executes on a mobile device or is accessible via a web browser, may be stored on a non-transitory computer-readable medium.

Other embodiments may be in the form of a system. The system of such embodiments includes at least one processor, at least one memory device, and at least one network interface device. The system further includes an application stored on the at least one memory device and executable by the at least one processor to store data in a database and provide application functionality within a first networked computing environment via the at least one network interface device. In such embodiments, at least a portion of the application functionality is callable via one or more application services.

The system further includes a middleware interface module stored on the at least one memory device. The middleware interface module includes and provides a set of services executable by the at least one processor. The services may include a download service to receive data download requests with regard to middleware objects and to provide a response. A data download request in such embodiments typically includes at least a middleware object identifier calling the download service. The response to the data download request may be generated by retrieving, from the database, identifiers of data items relevant to the requesting middleware object and retrieving the data items corresponding to the retrieved data item identifiers. The download service may then generate and transmit the response, in the form of a data structure including the retrieved data items, to the middleware object of the middleware object identifier.

The middleware interface module may also include an online service to receive and service functionality invoking requests from middleware objects. Processing of a functionality invoking request by the online service may include calling at least one application service and receiving a response thereto. The online service may then transmit at least a portion of the response to a middleware object from which the functionality invoking request was received.

In a further embodiment, the middleware interface module includes at least one further service in the form of an upload service. The upload service of such embodiments receives data updates from middleware objects. Data updates received by the upload service will typically be received with a data structure including a data update. The data structure may be received in the JSON format and identify each included data item and a value thereof. The update service may then determine database locations to which the updated data is to be stored or one or more services to utilize in updating the received data. The upload service may then issue at least one data update command to the database or call one or more identified services based on a the determined storage locations. Further, upon receipt of a success response to the data update command or commands, the upload service may transmit a success response to the middleware object. Alternatively, upon receipt of a failure response to the data update command or commands, the upload service will issue a rollback command the data update and transmit a failure response to the middleware object.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method of interfacing a backend system application to a mobile device application comprising:
   receiving a service call to the backend system application from a middleware object in communication with the mobile device application, the service call including a request for data;
   with regard to the data request, identifying data to be included in a first transport data structure provided in response to the data request based on the middleware object from which the service call was received and configuration data retrieved from a database table identifying data items that are active and inactive with regard to the middleware object, an active data item being a data item the middleware object is capable of processing and an inactive data item being a data item the middleware object is not capable of processing;
   retrieving the identified data; and
   calling a data transport process to build the first transport data structure containing the retrieved data and to transmit the first transport data structure to the middleware object.

2. The method of claim 1, wherein the service call is a Hyper-Text Transport Protocol call received over a network.

3. The method of claim 1, wherein the database table that identifies active data items the middleware object is capable of processing and inactive data items the middleware object is not capable of processing includes a row of data for each of a plurality of middleware objects, the row of data for each of the plurality of middleware objects identifying data items the respective middleware object is capable and not capable of processing.

4. The method of claim 1, wherein the first transport data structure built by the transport process is encoded in a format that identifies data items included in the transport data structure and data of each included data item.

5. The method of claim 4, wherein the format of the first transport data structure is a JavaScript Object Notation format.

6. The method of claim 1, further comprising:
   receiving, from the middleware object, a second transport data structure including a data update;
   reading data, including the updated data; from the second transport data structure;
   determining data storage locations to which the updated data read from the second transport data structure is to be stored;
   issuing a data update command based on the updated data read from the second transport data structure and the determined data storage locations;
   upon receipt of a success response to the data update command, calling the data transport process to build a third transport data structure with a reference to the second transport data structure and including data representative of the successful update and to transmit the third transport data structure to the middleware object; and
   upon receipt of a failure response to the data update command:
   issuing a rollback command; and
   calling the data transport process to build a fourth transport data structure with a reference to the second transport data structure and including data representative of the update failure and to transmit the fourth transport data structure to the middleware object.

7. A non-transitory computer-readable medium, with instructions stored thereon, which when executed by at least one processor of at least one computing device, cause the at least one computing device to:
   receive a service call from a middleware object, the service call including a request for data;
   identify data to be included in a first transport data structure provided in response to the data request based on the middleware object from which the service call was received and configuration data retrieved from a database table identifying data items that are active and inactive with regard to the middleware object, an active data item being a data item the middleware object is capable of processing and an inactive data item being a data item the middleware object is not capable of processing;
   retrieve the identified data; and
   call a data transport process to build the first transport data structure containing the retrieved data and to transmit the first transport data structure to the middleware object.

8. The non-transitory computer-readable medium of claim 7, wherein the middleware object is one of a plurality of middleware objects that exists within a middleware platform that operates to provide backend data and functionality access to mobile client apps over a network.

9. The non-transitory computer-readable medium of claim 7, wherein the database table that identities active data items the middleware object is capable of processing and inactive data items the middleware object is not capable of processing includes a row of data for each of a plurality of middleware objects, the row of data for each of the plurality of middleware objects identifying data items the respective middleware object is capable and not capable of processing.

10. The non-transitory computer-readable medium of claim 7, wherein:
   the request for data is received as a remote function call that retrieves data when executed; and
   retrieving the identified data includes causing the remote function call to be executed to retrieve the data; and
   identifying data to be included in the response to the data request includes:
   reading metadata associated with data items included in the retrieved data to identify any data items the middleware object is not capable of processing; and
   removing any data items from the retrieved data that the middleware object is not capable of processing.

11. The non-transitory computer-readable medium of claim 7, wherein the first transport data structure built by the transport process is encoded in a format that identifies data items included in the transport data structure and data of each included data item.

12. The non-transitory computer-readable medium of claim 7, with further instructions stored thereon, which when executed by the at least one processor of the at least one computing device, further cause the at least one computing device to:
   receive, from the middleware object, a second transport data structure including a data update;
   read data, including the updated data, from the second transport data structure;
   determine data storage locations to which the updated data read from the second transport data structure is to be stored;
   issue an update command based on the updated data read from the second transport data structure and the determined data storage locations;
   upon receipt of a success response to the data update command, call the data transport process to build a third transport data structure with a reference to the second transport data structure and including data representative of the successful update and to transmit the third transport data structure to the middleware object; and
   upon receipt of a failure response to the data update command:
   issue a rollback command; and
   call the data transport process to build a fourth transport data structure with a reference to the second transport data structure and including data representative of the update failure and to transmit the fourth transport data structure to the middleware object.

13. A system comprising:
   at least one computer processor, at least one memory device, and at least one network interface device;
   an application stored on the at least one memory device and executable by the at least one processor to store data in a database and provide application functionality within a first networked computing environment via the at least one network interface device, at least a portion of the application functionality callable via one or more application services;
   a middleware interface module stored on the at least one memory device, the middleware interface module including a set of services executable by the at least one processor, the services including:
   a download service to receive data download requests with regard to middleware objects, a data download request including at least a middleware object identifier, a response to the data download request generated by:
   retrieving, from the database, identifiers of data items to be included in a data structure to be transmitting in response to the download request that are relevant to the requesting middleware object, wherein data items relevant to the middleware requesting object are identified in configuration data that identifies data items that are active and inactive with regard to the requesting middleware object, an active data item being a data item the middleware object is capable of processing and is therefore relevant and an inactive data item being a data item the middleware object is not capable of processing and is therefore not relevant;
   retrieving, from the database, data items corresponding to the retrieved data item identifiers; and
   generating and transmitting a data structure including the retrieved data items to the middleware object of the middleware object identifier.

14. The system of claim 13, wherein the middleware interface module includes at least one further service, the at least once further service including:
   an online service to receive and service functionality invoking requests from middleware objects via the at least one network interface device, the processing of a functionality invoking request including calling at least one application service, receiving a response thereto, and transmitting at least a portion of the response to a middleware object from which the functionality invoking request was received.

15. The system of claim 14, wherein the middleware interface module includes at least one further service, the at least once further service including:
   an upload service to receive data updates from middleware objects; the upload service executable to:
   receive, from a middleware object, a data structure including a data update;
   determine database locations to which the updated data is to be stored;
   issue at least one data update command to the database based on a the determined storage locations;
   upon receipt of a success response to the data update command, transmitting a success response to the middleware object; and
   upon receipt of a failure response to the data update command, rollback the data update and transmit a failure response to the middleware object.

16. The system of claim 15, wherein the download, online; and upload services are each remote functions that are callable by middleware objects via remote function calls.

17. The system of claim 15, wherein the middleware interface module includes at least one further service, the at least once further service including:
   a transport service that upon receipt of a middleware object identifier and data to be transmitted to the identified middleware object, builds a transport data structure containing data for transmission to the identified middleware object encoded in a format that identifies data items included in the transport data structure and data of each included data item.

18. The system of claim 17, wherein the download, online, and upload services, when transmitting data to middleware objects calls the transport service.

* * * * *